United States Patent [19]

Francis

[11] Patent Number: 5,089,445
[45] Date of Patent: Feb. 18, 1992

[54] FUSION SEALING MATERIALS

[75] Inventor: Gaylord L. Francis, Painted Post, N.Y.

[73] Assignee: Corning Incorporated, Corning, N.Y.

[21] Appl. No.: 594,629

[22] Filed: Oct. 9, 1990

[51] Int. Cl.$^5$ .............................. C03C 8/14; C03C 8/18; C03C 8/24; C03C 14/00

[52] U.S. Cl. .................................. 501/15; 501/17; 501/19; 501/32

[58] Field of Search ............... 501/15, 17, 32, 10, 501/19

[56] References Cited

U.S. PATENT DOCUMENTS

| | | | |
|---|---|---|---|
| 3,258,350 | 6/1966 | Martin | 501/15 |
| 3,907,535 | 9/1975 | Muller | 501/22 |
| 3,951,669 | 4/1976 | Malmendier et al. | 501/15 |
| 4,186,023 | 1/1980 | Dumesnil | 501/15 |
| 4,238,704 | 12/1980 | Bonk et al. | 501/15 |

*Primary Examiner*—Mark L. Bell
*Attorney, Agent, or Firm*—Milton M. Peterson; Clinton S. Janes, Jr.

[57] ABSTRACT

There is disclosed a sealing material based on a lead sealing glass having a mill addition of a crystalline material having the crystalline structure of magnesium pyrophosphate. The effective coefficient of thermal expansion in a seal is substantially reduced by the mill addition, thereby permitting use with low expansion materials.

36 Claims, 4 Drawing Sheets

FUSION SEALING MATERIALS

RELATED APPLICATION

This application is related to patent application Ser. No. 07/598,001 entitled SEALING MATERIALS AND GLASSES, filed of even date herewith in the names of L. K. Cornelius, G. L. Francis and P. A. Tick, and assigned to the same assignee as this application. The related application is concerned with fusion seals and sealing materials based on oxyfluoride glasses containing mill additions. It is also concerned with oxyfluoride glasses adapted to such use.

FIELD OF THE INVENTION

The field is fusion sealing materials composed of lead glasses and mill additions of crystalline materials. The crystalline materials have the crystal structure of magnesium pyrophosphate and the capability of lowering the effective coefficient of thermal expansion (CTE) of the glass.

BACKGROUND OF THE INVENTION

A fusion sealing material may be applied to a single sealing surface, as in glazing or enameling. Alternatively, the material may be employed to join two opposed surfaces. The result is then referred to as an intermediate seal or joint. The present invention is applicable to either type of sealing operation.

As here used, the term "fusible sealing material" connotes material that may be thermally softened to flow and wet a surface, and that normally is composed of a base glass with or without a modifying additive. A "fused seal" is the result of fusing such material on, or between, sealing surfaces.

Fusion sealing is a well cultivated art. In particular, numerous special sealing glasses have been developed for use in joining glass parts with each other, or with metals, alloys, or ceramics.

In making a fusion seal, the sealing glass must be heated to a temperature where it becomes soft enough to wet the sealing surface and form an adherent, hermetic bond. For many purposes, it is desirable to maintain the sealing temperature as low as possible. This is particularly true in electrical and electronic articles where thermally sensitive parts or coatings are commonly employed.

Accordingly, considerable attention has been given to lead glasses as low temperature sealing glasses. For example, stable sealing glasses, having softening points in the 430°–500° C. range, and coefficients of thermal expansion in the $70–90 \times 10^{-7}/°C$. range, are disclosed in U.S. Pat. No. 2,642,633 (Dalton). Subsequent studies centered on lead zinc borate type glasses that were subject to thermal devitrification or crystallization. These glasses were intensively investigated in the search for cathode ray tube sealing materials.

Lead sealing glasses are widely used in conjunction with materials having CTEs in the $70–100 \times 10^{-7}/°C$. range. These include soda lime type glasses and various ceramics and metals. However, lead glasses are ineffective for lower expansion materials, such as fused silica, borosilicate glasses, and alumina. Some degree of expansion mismatch may be tolerated in some circumstances, but must be limited, and is generally undesirable.

The sealing art has recognized that high CTE values can be lowered by mill additions of materials having lower CTE values. Numerous additives have been proposed, particularly for use with the lead borate and lead zinc borate glasses. Among these are titanates, zircon and quartz. Also, crystalline materials having negative CTEs, such as beta-eucryptite, have been proposed.

In selecting a mill addition for CTE control, various other factors must also be considered. For example, it is important that the material be relatively inert. In particular, a mill addition should not react with, or dissolve in, the glass to which it is added. Not only will the CTE control be lost or modified, but such undesirable effects as bubbling, devitrification, and/or physical property changes may occur. Some additives, especially if used in large amounts, may sharply raise viscosity. This adversely affects flow characteristics during sealing.

PURPOSES OF THE INVENTION

A basic purpose is to provide an improved fusion sealing material that is useful with materials having low coefficients of thermal expansion.

Another purpose is to provide a highly effective mill addition to lower the effective coefficient of thermal expansion of lead sealing glasses.

A further purpose is to provide sealing materials that may be used with articles having CTEs below $70 \times 10^{-7}/°C$.

Another purpose is to provide a fusion seal based on a lead sealing glass and having an effective CTE below $70 \times 10^{-7}/°C$.

SUMMARY OF THE INVENTION

One aspect of my invention is a sealing material comprising a lead sealing glass and a mill addition of a crystalline material having essentially the crystalline structure of magnesium pyrophosphate. The effective crystalline phase in the ill addition may be magnesium pyrophosphate. Alternatively, it may be magnesium pyrophosphate wherein a portion of the magnesium cations are substituted for by at least one cation selected from cobalt, arsenic, zinc, aluminum, iron and zirconium.

PRIOR ART

In addition to the Dalton patent noted earlier, the following U.S. Pat. Nos., relating to mill additions to sealing glasses, are noted:

U.S. Pat. No. 3,258,350 (Martin) discloses the addition of up to 35% zircon to a lead borosilicate, or a lead zinc borate, glass to reduce the CTE from over $100 \times 10^{-7}/°C$. to as low as $80 \times 10^{-7}/°C$. in a fusion seal.

U.S. Pat. No. 3,907,535 (Muller) discloses adding aluminum titanate, or a negative temperature coefficient crystal, beta-eucryptite, to a thermally devitrifiable lead borate glass to provide a material for sealing to alumina.

U.S. Pat. No. 3,951,669 (Malmendier et al.) discloses use of zinc beta-quartz solid solution as an additive to halide modified lead borate or borosilicate glasses.

U.S. Pat. No. 4,186,023 (Dumesnil) discloses a variety of crystallized silicates and spinels as additions, in amounts up to 56% by volume, in lead borate and lead zinc borate glasses containing $Cu_2O$ and F. The mixture has a sealing temperature of 360°–430° C. and a CTE as low as $50 \times 10^{-7}/°C$.

U.S. Pat. No. 4,238,704 (Bonk et al.) discloses adding cordierite to zinc silicoborate glasses to reduce the CTE in a seal.

It may be noted that none of these patents is concerned with a pyrophosphate mill addition.

United Kingdom Patent No. 1,376,393 (Drake et al.) discloses increasing the flow temperature during sealing by using a mixture of glasses that react. An example is a calcium phosphate glass mixed with a lead borate glass. There is no indication of any effect on CTE.

BRIEF DESCRIPTION OF THE DRAWINGS

In the appended drawings.

GENERAL DESCRIPTION OF THE INVENTION

The present invention provides a sealing material composed essentially of a lead sealing glass and a novel mill addition for such a glass. The invention is based on my discovery that certain pyrophosphate crystalline materials, because of their crystal inversion, are capable of effecting a strong decrease in the effective CTE of a seal made with a lead glass. As a consequence, lead glasses may be used in making seals with low expansion glasses and ceramics.

There are several known families of lead sealing glasses, some of which can be thermally devitrified after producing a seal. These families include lead borates, lead borosilicates, lead zinc borates and lead titanates. The two common characteristics are: (1) a high lead oxide content which renders the glass soft, that is having a low melting temperature, and (2) a glass forming oxide, such as boric oxide or silica. Other modifying oxides and/or fluorides are optional. The present invention is generally applicable to all lead sealing glasses, the unique feature being the mill addition.

The mill addition is a crystalline pyrophosphate having the crystal structure of magnesium pyrophosphate ($Mg_2P_2O_7$). These materials are of particular interest because of their large negative CTE values. As a result, an addition of 10% by weight of $Mg_2P_2O_7$ to a sealing glass can impart a net negative CTE up to about 125° C. This appears to be caused by a large change in volume in the vicinity of 68° C., the inversion temperature of magnesium pyrophosphate.

It has further been found that the magnesium ion in magnesium pyrophosphate can be replaced by various other ions without altering the characteristic crystal structure of magnesium pyrophosphate. The replacement ions include cobalt, arsenic, zinc, aluminum, iron and zirconium in varying amounts.

The significant feature of the ion substitution is that, in spite of unchanged crystal structure, the inversion temperature does change. The nature and degree of change depend on both the ion substituted and the amount of the substitution. Thus, cobalt increases the inversion temperature, while the other ions decrease the inversion temperature. As a result, inversion temperatures from below 50° C. to near 300° C. can be obtained.

By proper selection and combination of pyrophosphate additions then, an essentially constant effective CTE can be achieved over this range.

The amount of pyrophosphate that can be added is governed largely by its effect on the viscosity of the fusible mixture, whereby a sealing surface may not be well wet by the sealing mixture. In general, I prefer not to add more than about 20% by volume (about 15% by weight) as a mill addition.

Figure 1:
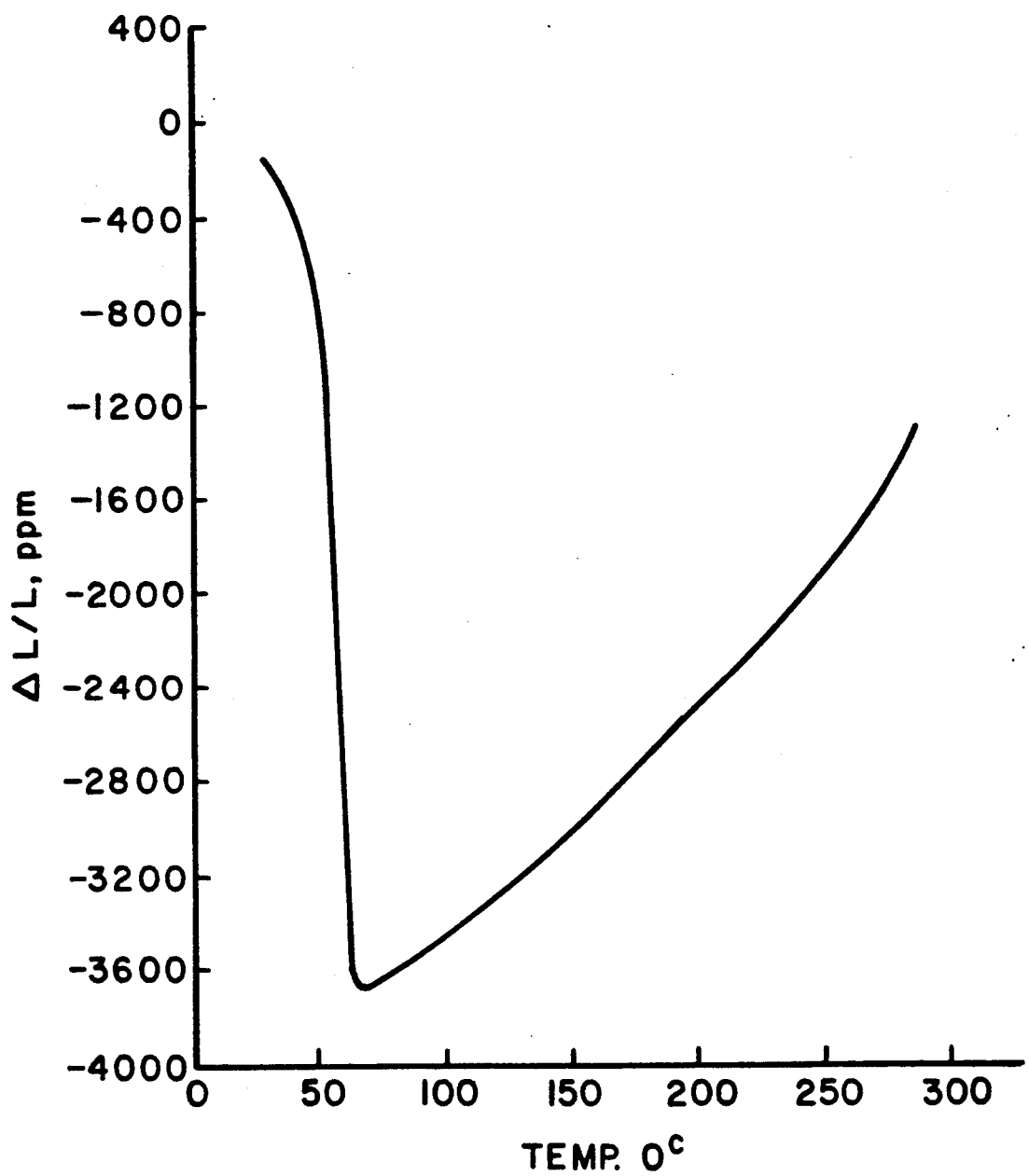
FIG. 1 is a graphical representation showing the effect of the magnesium pyrophosphate inversion on the expansion curve of a lead sealing glass.

FIG. 1 of the appended drawing graphically represents the expansion curve for a lead zinc borate glass having an addition of 13% by weight (about 17% by volume) of crystalline magnesium pyrophosphate. The steep dip in the curve results from the crystal inversion that occurs in the magnesium pyrophosphate crystal. The actual inversion temperature coincides with the bottom of the dip at about 68° C.

In the FIGURE, expansion ($\Delta L/L$), in parts per million (ppm), as measured by standard dilatometry means, is plotted on the vertical axis. Temperature, in °C., is plotted on the horizontal axis. The lead glass composition, in weight percent on an oxide basis, was: 83.0% PbO, 12.0% $B_2O_3$, 4.0% ZnO, 0.6% $SiO_2$ and 0.4% $SnO_2$. The magnesium pyrophosphate approximated stoichiometric proportions, that is, about 64% $P_2O_5$ and 36% MgO by weight.

Figure 2:
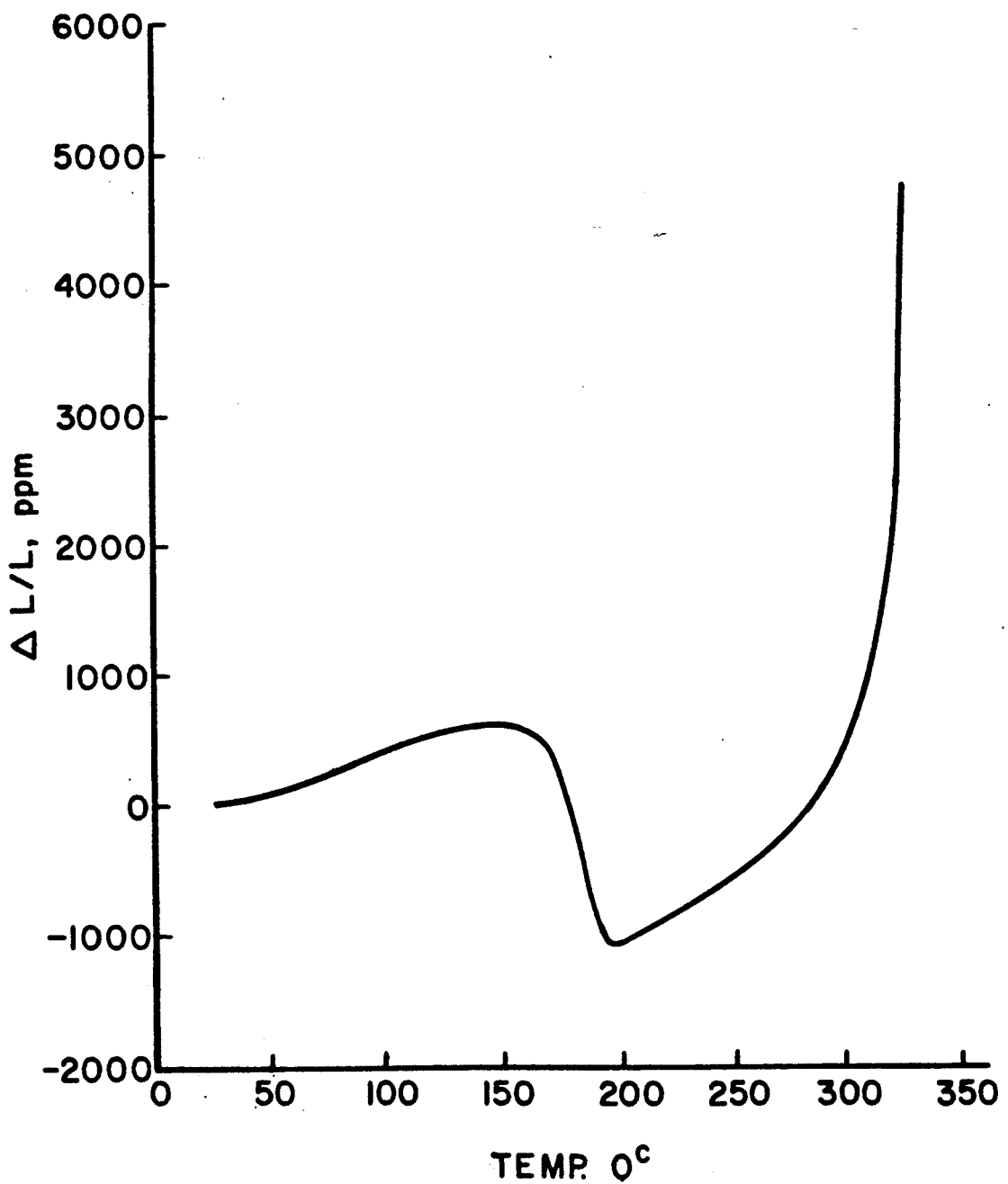
FIG. 2 is a graphical representation similar to that of FIG. 1, but showing the effect of the inversion of a cobalt-ion-substituted magnesium pyrophosphate in a lead sealing glass.

FIG. 2 is a graphical representation, similar to that of FIG. 1, but showing a different expansion curve. The data for FIG. 2 were obtained from measurements on the lead glass of FIG. 1 having a mill addition of 13% by weight crystalline $Mg_2P_2O_7$ wherein 64% of the magnesium ions had been substituted for by cobalt ions. As a result, 32% of the total cation content (Mg+P+Co) content is cobalt ions. It will be observed that the inversion temperature now occurs at about 195° C., rather than the 68° C. temperature with unsubstituted $Mg_2P_2O_7$.

Figure 3:
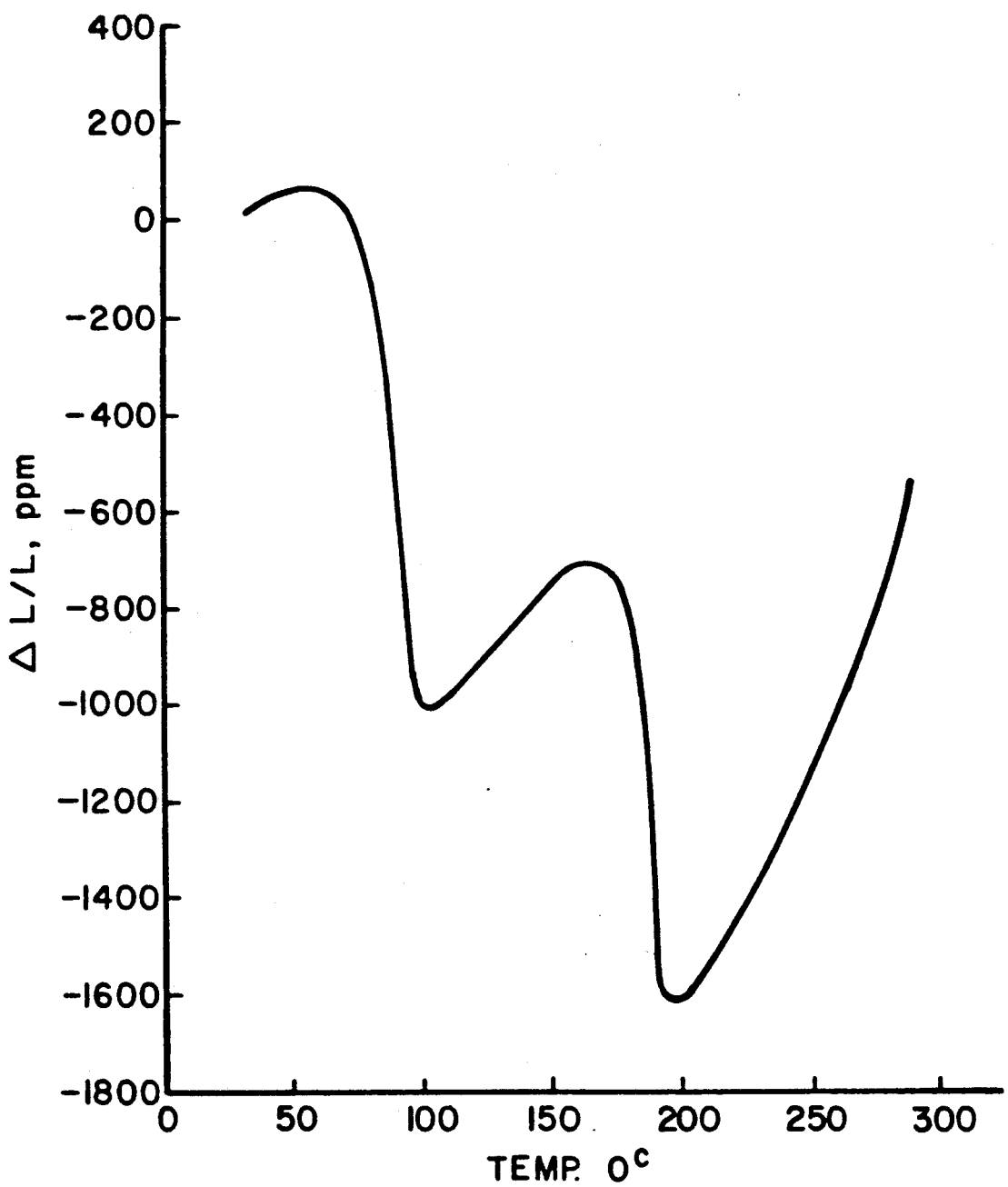
FIG. 3 is a graphical representation, also similar to FIG. 1, but showing the effect of a mixed pyrophosphate mill addition.

FIG. 3 is a graphical representation, also similar to that of FIG. 1, but showing a still different expansion curve. In this case, expansion measurements were made on the same lead glass in which two different mill additions were made. One was 8% by weight $Mg_2P_2O_7$ wherein 16% of the magnesium ions (8% of the total cations) had been substituted for by cobalt ions; the other 8% by weight $Mg_2P_2O_7$ wherein 64% of the magnesium ions (32% of the total cations) had been substituted for by cobalt ions. It will be observed that the 16% ion-substituted $Mg_2P_2O_7$ has imparted an inversion at a temperature of about 95° C., while the 64% ion-substituted $Mg_2P_2O_7$ has imparted an inversion at a temperature of about 195° C. It is apparent that, by proper selection of ion substituted mill additions, the effective CTE may be controlled over a wide temperature range.

Figure 4:
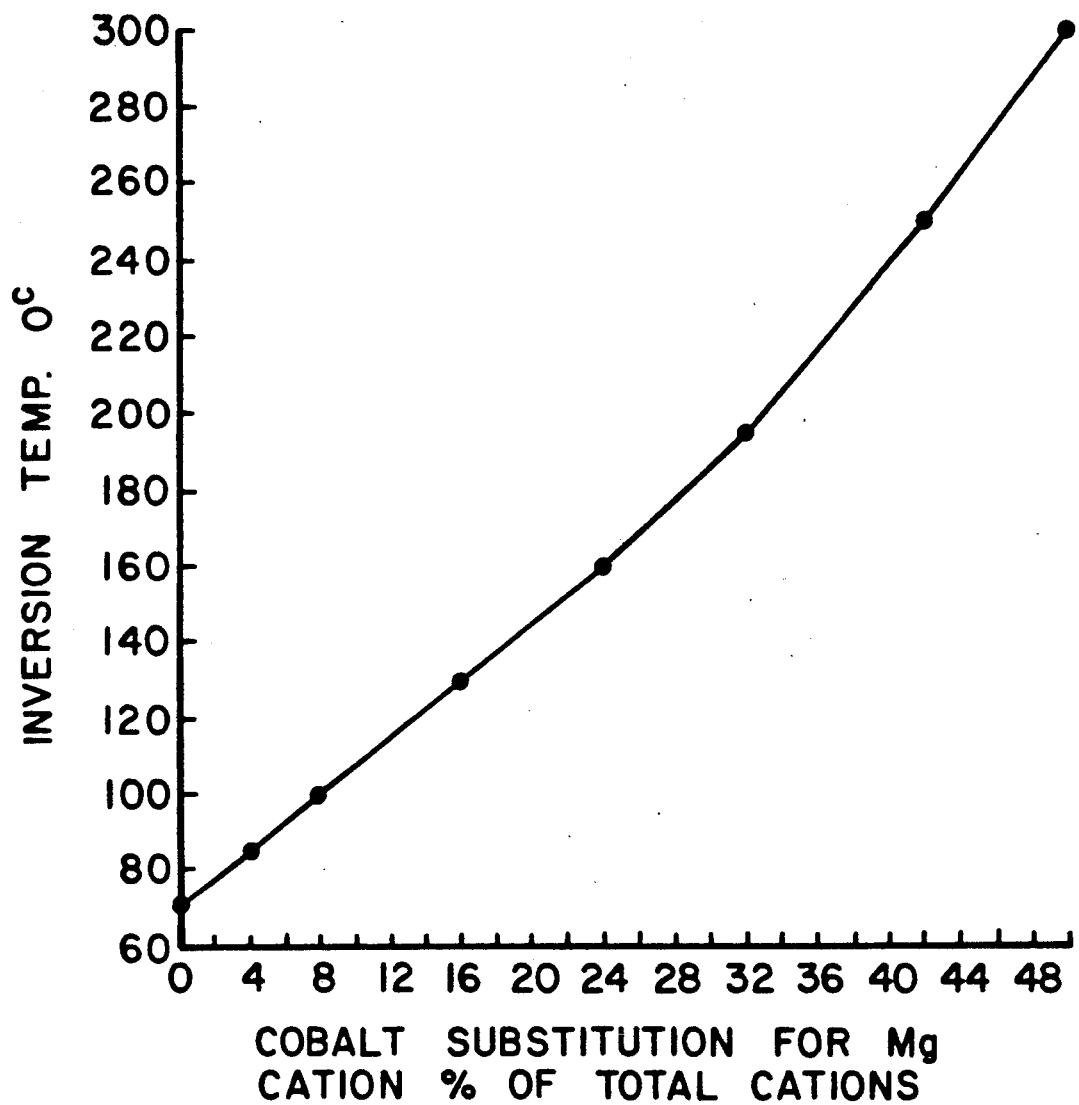
FIG. 4 is a graphical representation showing the progressive effect of cobalt ion substitution on the magnesium pyrophosphate inversion temperature.

FIG. 4 is a graphical representation showing the manner in which the inversion temperature of crystalline $Mg_2P_2O_7$ is increased as cobalt ions are progressively substituted for magnesium ions. In FIG. 4, the inversion temperature, in °C., is plotted on the vertical axis, while cobalt ion content, as percent of total cation content (Mg+Co+P), is plotted on the horizontal axis.

The pyrophosphates are of particular interest as mill additions because stress in a seal can be lowered to zero, and even beyond to create tension, by increasing the amount of the addition. Microcracking can occur in a seal, however. This is believed to be related to the presence of large particle size pyrophosphate. This suggests either fine grinding, or classification of the powder.

These remedies are limited by a greater tendency for fine materials to dissolve during the sealing process. Also, the effect of the pyrophosphates appears to be largely lost if the average particle size falls below about 15 microns.

Further study showed that the presence of Invar in a pyrophosphate mill addition also alleviated the microcracking problem. Accordingly, a preferred mill addition is a combination of Invar powder and a fine phosphate addition. The Invar may be added in substantial amount before it interferes with surface wetting and glass flow. Accordingly, amounts on the order of 30 to 40 percent by volume may be added. However, I normally prefer no more than about 20%.

TABLE I, below, sets forth compositions, calculated in weight percent on an oxide basis, for several phosphate glasses that were melted and crystallized for use as fillers in the course of developing the invention.

TABLE I

|  | A | B | C | D | E | F |
|---|---|---|---|---|---|---|
| MgO | 30.0 | 35.8 | 41.5 | 10.6 | 29.8 | 28.7 |
| $Al_2O_3$ | 1.0 | 1.0 | 1.0 | 0.75 | — | — |
| $P_2O_5$ | 69.0 | 63.2 | 57.5 | 50.8 | 62.4 | 60.2 |
| $Co_3O_4$ |  |  |  | 37.85 |  | 10.9 |
| $Fe_2O_3$ |  |  |  |  | 5.62 |  |
| $Na_2O$ |  |  |  |  | 2.18 |  |

Glass batches, based on these compositions, were prepared by blending other oxide ingredients into phosphoric acid ($H_3PO_4$) in a platinum crucible. The batch was then calcined at 440° C., after which the crucible was placed in a furnace at 1500° C. for two hours to melt the batch. The melts were poured into molds to prepare 4"×8" patties which crystallized as they were cooled to about 500° C. The patties were then annealed at that temperature, after which a portion of the crystallized glass was pulverized for use as a filler.

Sealing mixtures for CTE measurements were made from the lead zinc borate glass, with the several filler additions of TABLE I added in amounts of 13% by weight. To make a body for CTE testing, a portion of a sealing mixture was placed in a metal die. The die was then heated to 400° C. and a pressure of about 200 psi applied to the mixture. The resulting compressed body was cooled in the die to around 140° C. and then removed. The body was then ground to 1"×¼"×¼" dimensions for CTE measurements.

TABLE II identifies the several sealing mixtures and the CTE measurements obtained. TABLE II shows the filler used (identified by the letter designations of TABLE I); the inversion temperature in °C. (temp.), and the average CTE×$10^{-7}$ as measured over the temperature range of 25° C. to 150° C.

TABLE II

| Filler | Temp (°C.) | CTE × $10^{-7}$ |
|---|---|---|
| A | 68 | 57 |
| B | 68 | −243 |
| C | 68 | 96 |
| D | 195 | 46 |
| E | <50 | 118 |
| F | 95 | −211 |

X-ray analysis of the composition B material, after thermal crystallization, shows that it is almost completely a magnesium pyrophosphate ($Mg_2P_2O_7$) crystal phase. The oxide proportions closely correspond to the stoichiometric, 2:1 molar ratio of $Mg_2P_2O_7$, thus confirming the essential purity of the material.

The materials obtained by thermally crystallizing the melts from compositions A and C of TABLE I also show a magnesium pyrophosphate crystal phase. However, the non-stoichiometric ratio of MgO to $P_2O_5$ in these compositions leads to other crystal and/or glass phases. This appears to impede the effect of the pyrophosphate, and to create the erratic effects noted. Accordingly, in producing a magnesium pyrophosphate type filler, it is desirable to adhere closely to a stoichiometric ratio, as in compositions, B, D, E, and F.

The larger negative CTE for the sealing material utilizing the filler having composition B is thought to be occasioned by a dramatic inversion in the magnesium pyrophosphate crystal at about 68° C. This effect is illustrated in FIG. I of the drawings wherein the Composition B material was used as a filler in obtaining the plotted data. Likewise, a filler having composition D was used in obtaining the data plotted in FIG. 2. Finally, the data plotted in FIG. 3 was obtained using compositions D and F fillers.

I claim:

1. A sealing material comprising a lead sealing glass and a mill addition of a pyrophosphate crystalline material selected from the group consisting of magnesium pyrophosphate, a magnesium pyrophosphate with at least a portion of the magnesium ions replaced by at least one cation selected from the group composed of cobalt, arsenic, zinc, iron, aluminum and zirconium, and a crystallized phosphate glass composed essentially of $P_2O_5$ and one or more cations selected from the group composed of magnesium, cobalt, arsenic, zinc, iron, aluminum and zirconium.

2. A sealing material in accordance with claim 1 wherein the lead sealing glass is a lead borate glass.

3. A sealing material in accordance with claim 2 wherein the lead sealing glass is a lead zinc borate glass.

4. A sealing material in accordance with claim 1 wherein the lead sealing glass is a lead borosilicate.

5. A sealing material in accordance with claim 1 wherein the lead sealing glass is a lead titanate glass.

6. A sealing material in accordance with claim 1 wherein the mill addition is magnesium pyrophosphate.

7. A sealing material in accordance with claim 1 wherein the mill addition is magnesium pyrophosphate with a portion of the magnesium cations replaced by at least one cation selected from the group composed of cobalt, arsenic, zinc, iron, aluminum, and zirconium.

8. A sealing material in accordance with claim 7 wherein the replacing cation in the magnesium pyrophosphate is cobalt.

9. A sealing material in accordance with claim 7 wherein the replacing cation in the magnesium pyrophosphate is zinc.

10. A sealing material in accordance with claim 1 wherein the selected mill addition is composed of at least two different pyrophosphate crystalline materials with at least one being a magnesium pyrophosphate with at least a portion of the magnesium cations being replaced by at least one cation selected from the group composed of cobalt, arsenic, zinc, iron, aluminum and zirconium.

11. A sealing material in accordance with claim 10 wherein one of the crystalline materials is magnesium pyrophosphate.

12. A sealing material in accordance with claim 10 wherein the selected mill addition is a crystallized phosphate glass composed essentially of $P_2O_5$ and one or more cations selected from the group composed of magnesium, cobalt, arsenic, zinc, iron, aluminum and zirconium.

13. A sealing material in accordance with claim 12 wherein the mill addition is a crystallized glass composed essentially of MgO and $P_2O_5$ in about the stoichiometric molar ratio of magnesium pyrophosphate.

14. A sealing material in accordance with claim 13 wherein the crystallized glass composition further includes at least one oxide selected from the group composed of cobalt, arsenic, zinc, aluminum, iron and zirconium, and the molar ratio of the total of such selected oxide(s) plus MgO to the $P_2O_5$ is about the stoichiometric molar ratio of magnesium pyrophosphate.

15. A sealing material in accordance with claim 14 wherein the selected oxide is cobalt oxide.

16. A sealing material in accordance with claim 14 wherein the selected oxide is zinc oxide.

17. A sealing material in accordance with claim 1 wherein the sealing material additionally contains Invar particles.

18. A sealing material in accordance with claim 1 wherein the mill addition constitutes not more than about 20% by volume of the material.

19. A fusion seal composed of a fused mixture comprising a lead sealing glass and, dispersed therein, a mill addition of a crystalline material selected from the group composed of magnesium pyrophosphate, a magnesium pyrophosphate with at least a portion of the magnesium ions replaced by at least one cation selected from the group composed of cobalt, arsenic, zinc, iron, aluminum and zirconium and a crystallized phosphate glass composed essentially of $P_2O_5$ and one or more cations selected from the group composed of magnesium, cobalt, arsenic, zinc, iron, aluminum and zirconium.

20. A fusion seal in accordance with claim 19 wherein the lead sealing glass is a lead borate glass.

21. A fusion seal in accordance with claim 20 wherein the lead sealing glass is a lead zinc borate glass.

22. A fusion seal in accordance with claim 19 wherein the lead sealing glass is a lead borosilicate.

23. A fusion seal in acordance with claim 19 wherein the lead sealing glass is a lead titanate glass.

24. A fusion seal in accordance with claim 19 wherein the mill addition is magnesium pyrophosphate.

25. A fusion seal in accordance with claim 19 wherein the mill addition is magnesium pyrophosphate with a portion of the magnesium cations replaced by at least one cation selected from the group composed of cobalt, arsenic, zinc, iron, aluminum, and zirconium.

26. A fusion seal in accordance with claim 25 wherein the replacing cation in the magnesium pyrophosphate is cobalt.

27. A fusion seal in accordance with claim 25 wherein the replacing cation in the magnesium pyrophosphate is zinc.

28. A fusion seal in accordance with claim 19 wherein the selected mill addition is composed of at least two different pyrophosphate crystalline materials with at least one being a magnesium pyrophosphate with at least a portion of the magnesium cations being replaced by at least one cation selected from the group composed of cobalt, arsenic, zinc, iron, aluminum and zirconium.

29. A fusion seal in accordance with claim 28 wherein one of the crystalline material is magnesium pyrophosphate.

30. A fusion seal in accordance with claim 19 wherein the selected mill addition is a crystallized phosphate glass composed essentially of $P_2O_5$ and one or more cations selected from the group composed of magnesium, cobalt, arsenic, zinc, iron, aluminum and zirconium.

31. A fusion seal in accordance with claim 30 wherein the mill addition is a crystallized glass composed essentially of MgO and $P_2O_5$ in about the stoichiometric molar ratio of magnesium pyrophosphate.

32. A fusion seal in accordance with claim 31 wherein the crystallized glass composition further includes at least one oxide selected from the group composed of cobalt, arsenic, zinc, aluminum, iron and zirconium, and the molar ratio of the total of such selected oxide(s) plus MgO to the $P_2O_5$ is about the stoichiometric molar ratio of magnesium pyrophosphate.

33. A fusion seal in accordance with claim 32 wherein the selected oxide is cobalt oxide.

34. A fusion seal in accordance with claim 32 wherein the selected oxide is zinc oxide.

35. A fusion seal in accordance with claim 19 wherein the seal additionally contains Invar particles.

36. A fusion seal in accordance with claim 19 wherein the mill addition constitutes not more than about 20% by volume of the material.

* * * * *